Aug. 30, 1966       H. M. McLEARN ETAL       3,269,571
                BULK PRODUCE BOX DUMPING DEVICE
Filed Nov. 18, 1963                          6 Sheets-Sheet 1
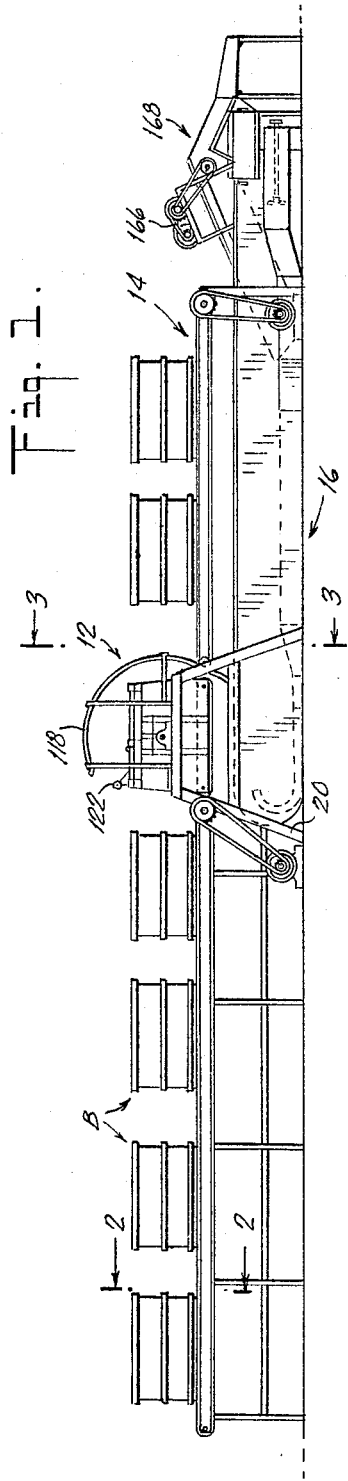
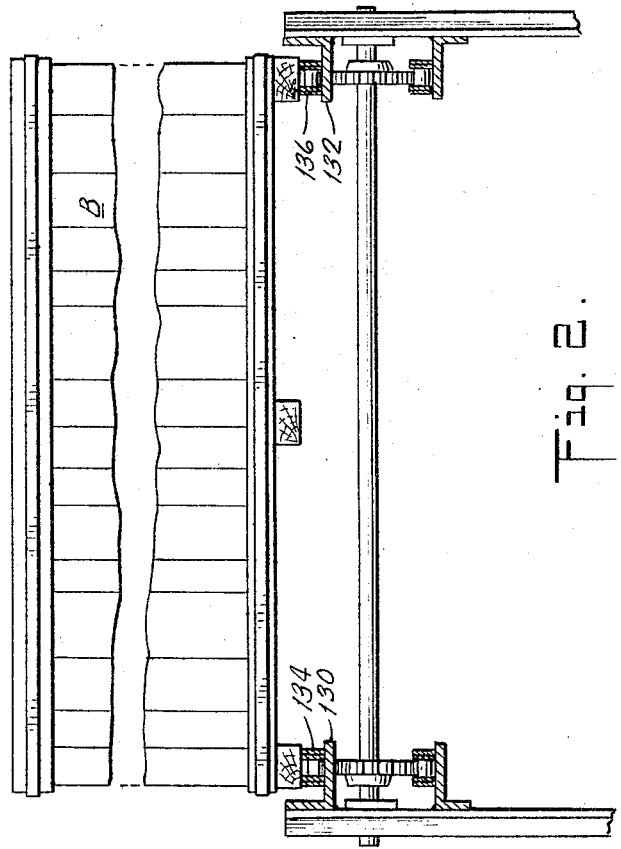
INVENTORS
HERBERT M. McLEARN
FRANK P. SKIPPER
BY
Robert S. Dunham
ATTORNEY

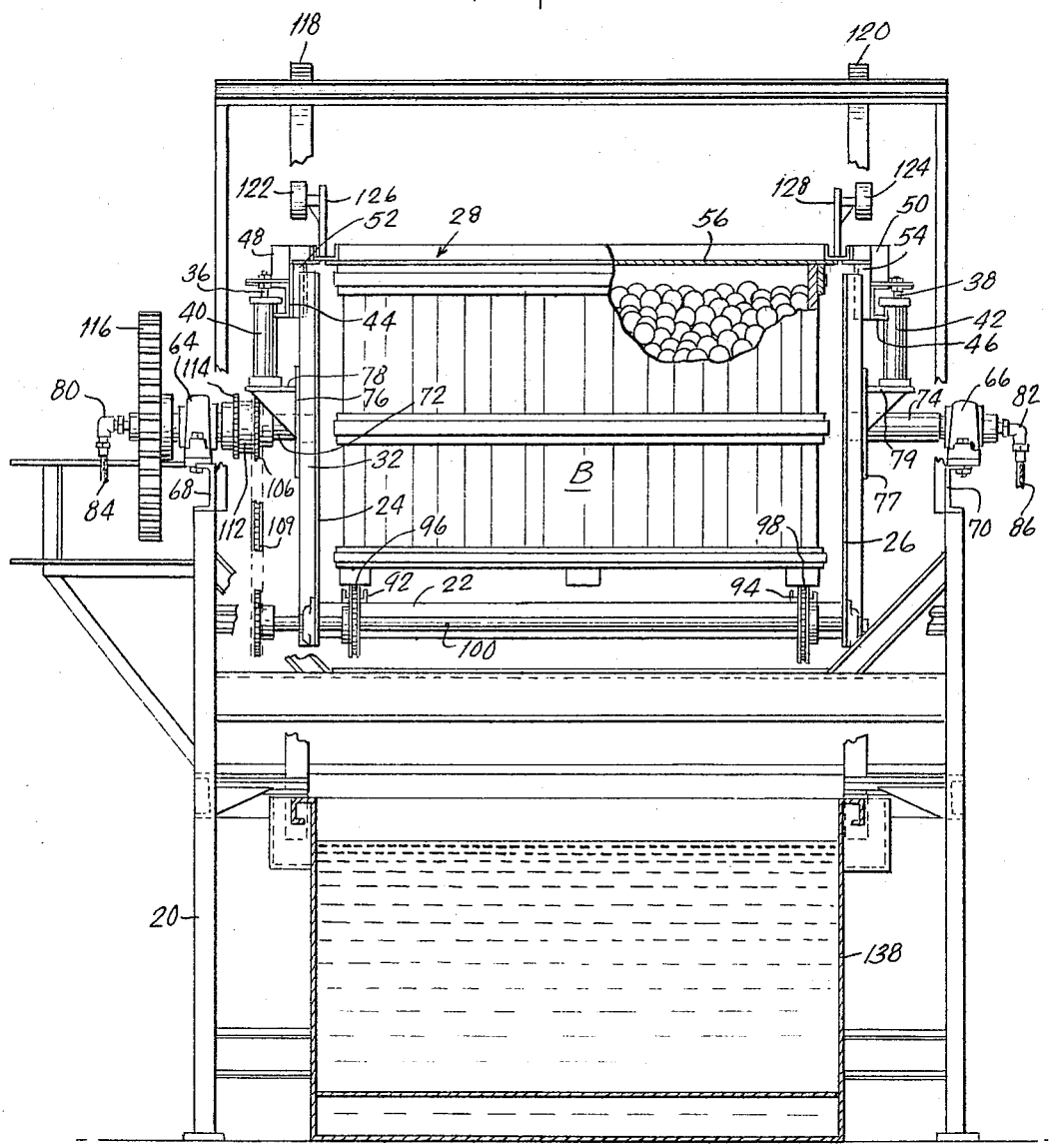

Aug. 30, 1966  H. M. McLEARN ETAL  3,269,571
BULK PRODUCE BOX DUMPING DEVICE
Filed Nov. 18, 1963  6 Sheets-Sheet 3
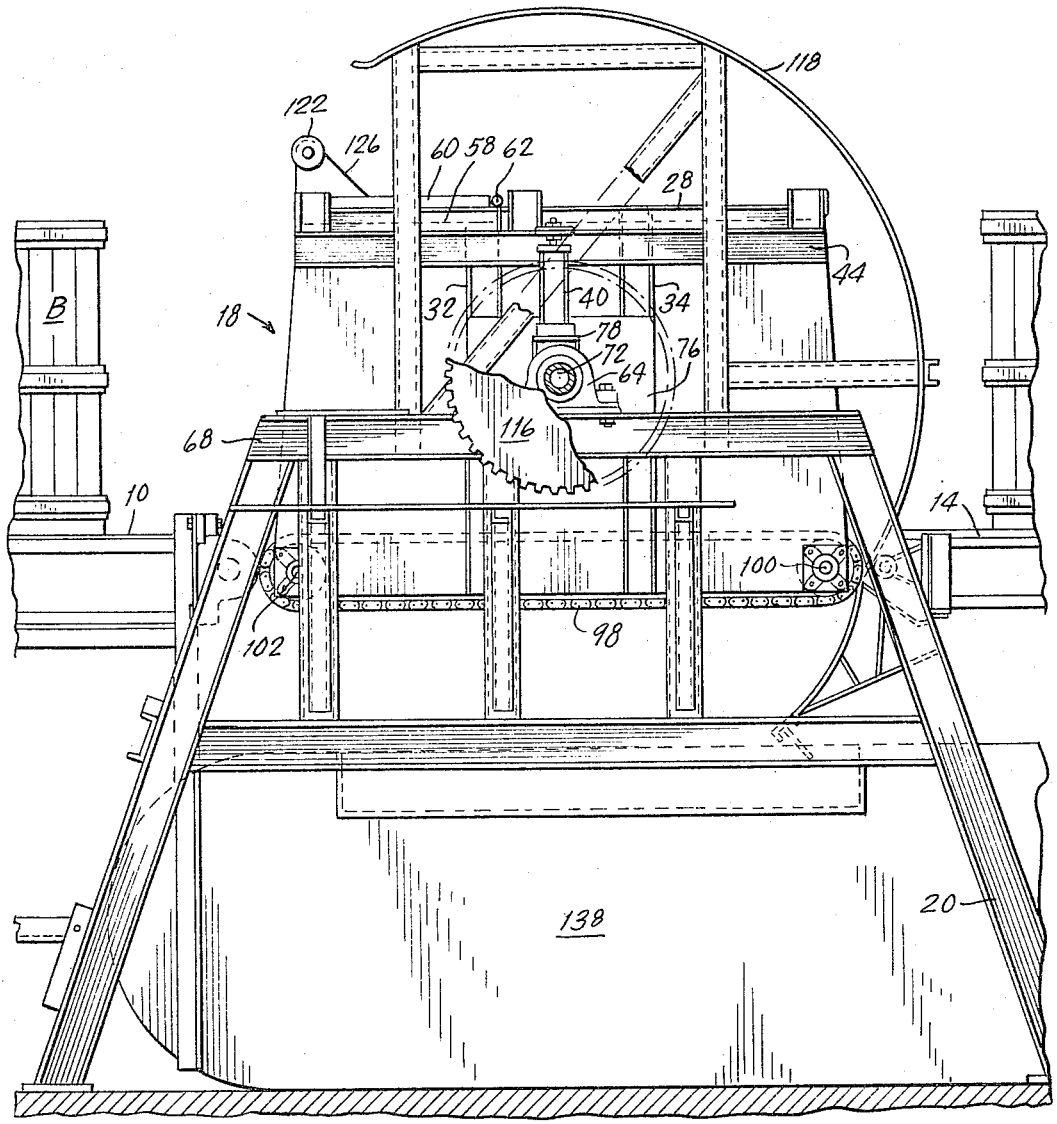
INVENTORS
HERBERT M. McLEARN
FRANK P. SKIPPER
BY
Robert S. Dunham
ATTORNEY

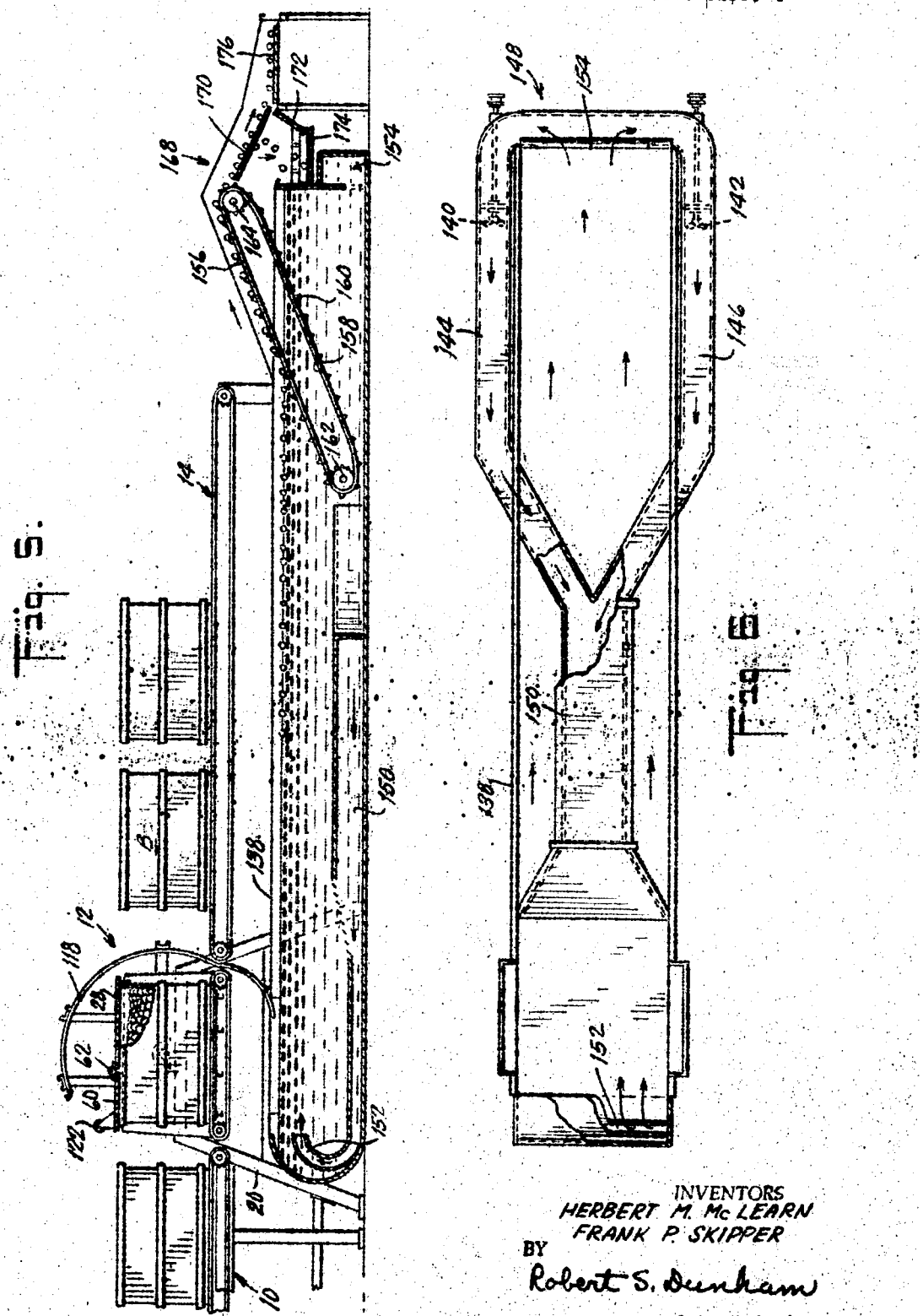

Aug. 30, 1966  H. M. McLEARN ETAL  3,269,571
BULK PRODUCE BOX DUMPING DEVICE
Filed Nov. 18, 1963  6 Sheets-Sheet 5

INVENTORS
HERBERT M. McLEARN
FRANK P. SKIPPER
BY
Robert S. Dunham
ATTORNEY

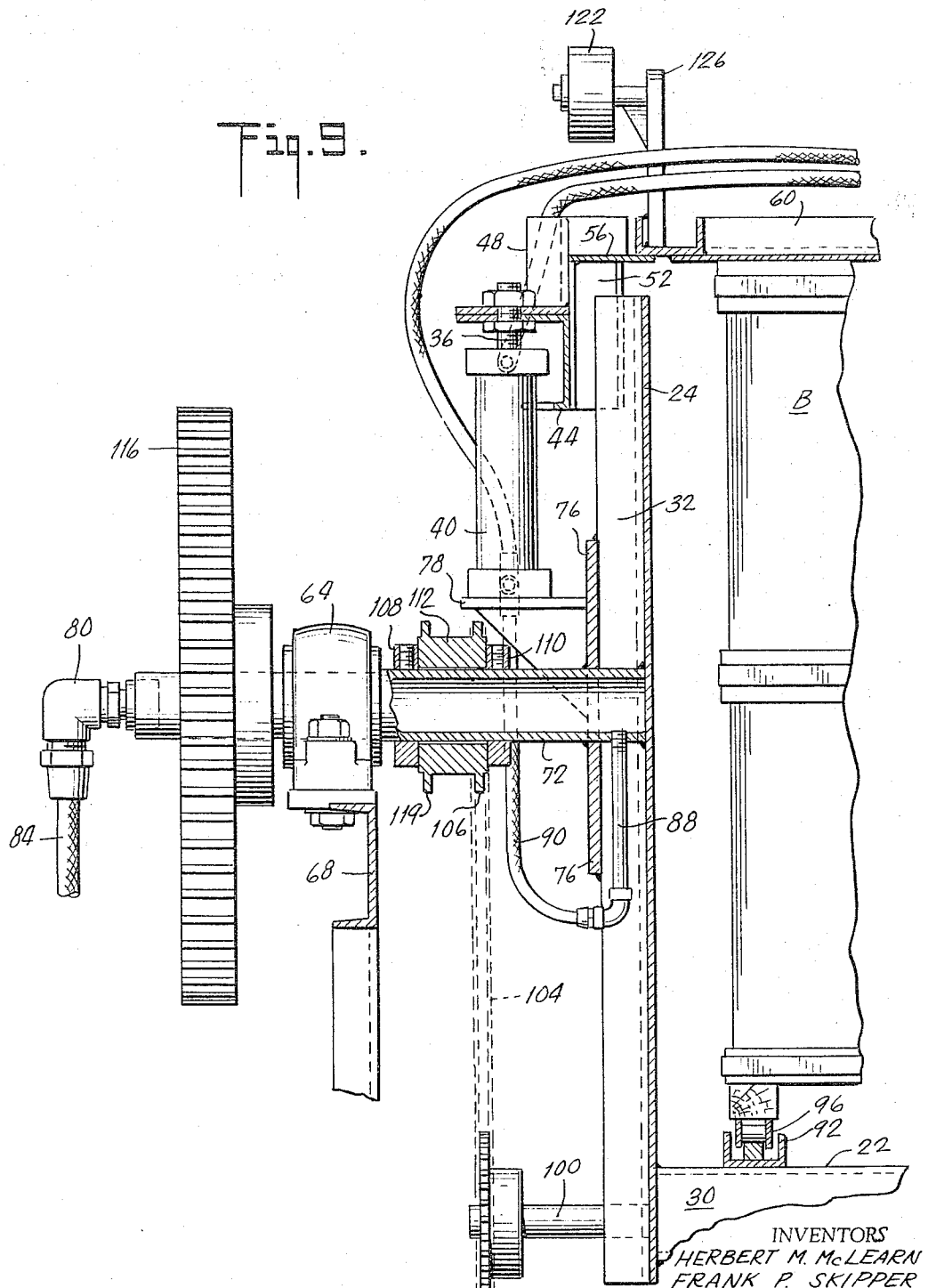

United States Patent Office 3,269,571
Patented August 30, 1966

3,269,571
BULK PRODUCE BOX DUMPING DEVICE
Herbert M. McLearn, Maitland, and Frank P. Skipper, Orlando, Fla., assignor to American Machinery Corporation, Orlando, Fla., a corporation of Delaware
Filed Nov. 18, 1963, Ser. No. 324,484
11 Claims. (Cl. 214—302)

This invention relates to mechanism for handling and processing produce. In its particular aspects, the invention is concerned with apparatus for dumping, receiving, and conveying produce such as fruits and vegetables.

Fruits and vegetables when harvested are frequently transported from fields, groves and orchards in very large open topped pallet boxes. While resort to large transport boxes has resulted in economical handling of the produce, it has been attended by difficulties arising from the size and weight of the boxes when filled with produce. Furthermore, the distance through which produce falls when being dumped from large boxes is increased to the point where serious damage to the produce is a constant hazard.

It is, therefore, the principal purpose of the invention to provide mechanism capable of dumping produce from large boxes in a controlled stream, with avoidance of damage to the produce being dumped.

It is a further object of the invention to provide means, in combination with a box dumping device, for cushioning the fall of the produce being dumped.

A further purpose of the invention is to provide a produce handling system having means for delivering produce to a processing line in an even and well controlled stream without regard to the rate at which the produce is dumped to the delivery means.

It is still a further object of the invention to provide mechanism for dumping produce from open topped boxes which is capable of completely inverting the boxes while controlling the fall of produce therefrom until complete inversion of the boxes is accomplished, whereby the boxes are completely emptied and the fall of the produce is reduced to a minimum.

These and other useful objects of the invention are accomplished by providing a rotatably mounted, self-loading box dumping cradle which has associated therewith a lid which is adapted to cover the open top of the produce box and clamp the box into the cradle. The lid is provided with a produce discharge aperture having a cover thereon which is associated with a cover control mechanism effective to hold the cover closed until the cradle and the box therein are rotated into a substantially fully inverted produce dumping position, whereby the distance through which the produce must fall is minimized. The dumping cradle is positioned over one end of an elongated produce receiving and conveying unit. The latter unit in a preferred form comprises a tank containing water which serves as a cushion against the fall of the produce being dumped, and at the same time a controlled unidirectional flow of water in the tank is maintained whereby the produce is carried from the delivery end of the tank to the end remote therefrom where the produce is delivered for normal processing in an even stream without regard to the rate at which the produce is dumped.

A practical embodiment of the invention is described in the following specification which is illuminated by the accompanying drawings in which like reference numerals indicate like parts, and in which:

FIG. 1 is a side elevational schematic view of the box dumping system to which the invention pertains;

FIG. 2 is a cross-sectional view on line 2—2 of FIG. 1;

FIG. 3 is a view, partially in section and partially in full line, on line 3—3 of FIG. 1;

FIG. 4 is a side elevational view of the box dumping unit, parts being broken away to show underlying structure;

FIG. 5 is a longitudinal elevational view, partially in section and partially in full line, illustrating features of the produce-receiving unit in association with the box dumping unit;

FIG. 6 is a plan view of the produce-receiving unit, partly in section;

FIG. 9 is a fragmentary view on an enlarged scale showing certain details of the box dump cradle and its mounting and drive means in association therewith.

Figure 7:
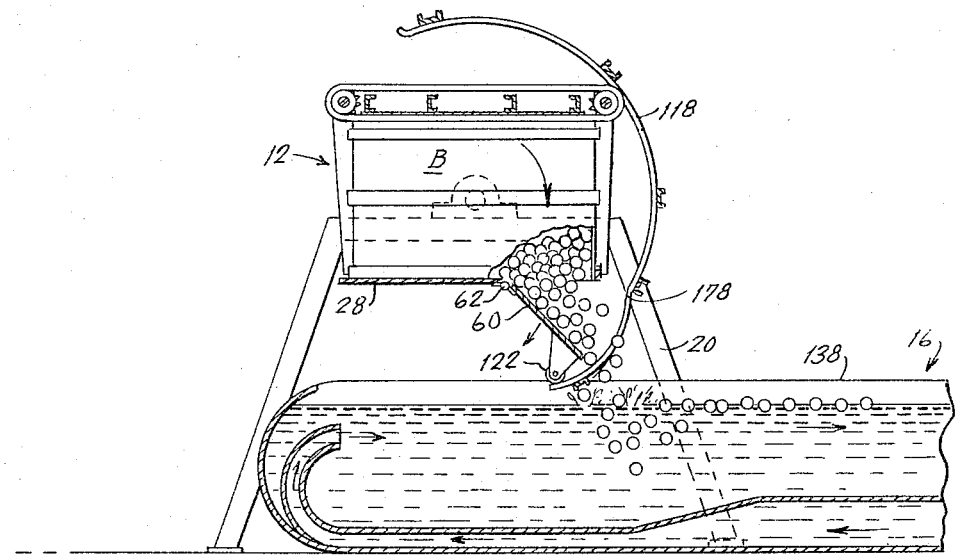
FIG. 7 is a schematic view of the box dumping unit in association with the produce-receiving unit, showing the inversion of a pallet box during the initial phase of a produce dumping operation.

As seen in FIG. 1, a complete box dumping system as contemplated herein consists of a box feed-in conveyor 10, a box dumping unit 12, a box take-off conveyor 14 and a produce-receiving unit 16.

The details of the box dumping unit 12 are best illustrated in FIGS. 3, 4 and 9. By reference to these figures, it can be seen that the unit comprises a box cradle 18 which is mounted for rotation on a base frame 20. The box cradle 18 is comprised of a floor or platform 22, a pair of side walls 24 and 26 and a lid 28. The floor 22 of the cradle is supported by a plurality of transverse sills 30 to which the side walls 24 and 26 are rigidly attached. The side walls are reinforced by a plurality of upright structural members such as the channel members 32 and 34 shown in association with the side wall 24 in FIG. 3.

A lid 28 is associated with the cradle by mounting the same on piston rods 36 and 38 of a pair of fluid pressure cylinders 40 and 42, respectively (FIG. 3), which interconnect the lid with the side walls 24 and 26 of the cradle. The lid structure includes a pair of longitudinal beams 44 and 46 which provide a laterally extending flange to which the respective pistons 36 and 38 are attached such that the entire lid may be raised or lowered by the fluid pressure devices 40 and 42. The lid is provided with a plurality of depending bracket structures 48 and 50 which include guide members 52 and 54 slidingly engaged with the cradle uprights 32 and 34 for guiding the lid in respect to the cradle as it is raised and lowered by the fluid pressure devices 40 and 42.

The deck 56 of the lid is cut away across one end thereof to form a produce discharge passage 58. This passage is closed by a cover 60 mounted to swing on a hinge 62 attached to the lid along the inner edge of the discharge passage 58.

The cradle structure is mounted on the base frame 20 by means of a pair of pillow blocks 64 and 66 which, in turn, are fixed respectively to the horizontal head rails 68 and 70 of the base frame.

The cradle structure is rotatably mounted in the pillow blocks 64 and 66 by means of a pair of cradle stub axles 72 and 74. These axles, as best seen in FIG. 9, are tubular in form and have their inner ends fixed to the side walls of the cradle, as seen in respect to the side wall 24 of FIG. 9. Further support is afforded the axles by reinforcing plates 76 and 77 which are apertured to accommodate the axles and which are rigidly attached to the upright channels 32 and 34 at one side of the cradle and to their counterpart at the other side of the cradle. The reinforcing plates 76 and 77 carry brackets 78 and 79, respectively, on which the fluid pressure cylinders are mounted.

The axles 72 and 74 are preferably constructed of cold drawn seamless tubing and serve as conduits in the fluid circuit of the cylinders 40 and 42. To this end, as best seen in FIGS. 3 and 9, the outer ends of the respective axles are provided with pressure fittings 80 and 82 connecting the axles with fluid pressure conduits 84 and 86, respectively. The inner ends of the axles (FIG. 9) communicate with the fluid pressure cylinders 40 and 42 by means of fittings such as the fitting shown in FIG. 9 consisting of the pipe 88 and a flexible conduit 90. The fluid pressure devices 40 and 42 may be connected either in series or in parallel with a source of fluid pressure as may be desired. The control of flow and pressure of fluid in the system is effected in a conventional manner and, therefore, need not be described in detail.

The floor 22 of the box dumping cradle has a pair of laterally spaced conveyor channels 92 and 94 supported thereon. These channels are adapted to accommodate conveyor tracks for a pair of endless roller conveyor chains 96 and 98. The endless roller conveyor chains 96 and 98 are trained about sprockets rotating with a head shaft 100 and an idler sprocket shaft 102. The head shaft is driven by a sprocket chain 104 which is trained about a sprocket 106 mounted for free rotation on the stub axle 72 by a pair of collars 108 and 110. The sprocket 106 is formed on a common hub 112 with a second sprocket 119 to which power may be applied from any suitable source, by way of a clutch (not shown) which is disengaged when the cradle is being rotated. Thus, when the sprocket 106 is driven, the conveyors 92 and 94 within the dump cradle will operate to move a pallet box B into the cradle.

A drive gear 116 is fixed to the outer end of the stub axle 72 and power is applied thereto in conventional manner by any suitable power source for rotating the dump cradle.

In order to control the position of the hinged cover 60 during rotation of the dump cradle, a pair of upwardly extending arcuate cover cams 118 and 120 are supported from the base frame. These cams are adapted, respectively, for coaction with a pair of cover cam followers 122 and 124 (FIG. 3) which are respectively rotatably mounted on a pair of upstanding brackets 126 and 128 fixed to opposite ends of the cover 60. The cover cams 118 and 120 are so formed and constructed as to keep the cover 60 closed during the initial part of dump cradle rotation.

As pointed out in respect to FIG. 1, the box dumping unit 12 is designed for association with a box feed-in conveyor 10 and a box take-off conveyor 14, both of which are preferably power driven and both of which may be generally constructed as shown in FIG. 2. Suitable conveyors will provide a pair of laterally spaced elevated conveyor tracks 130 and 132 for accommodating, respectively, the upper flight of endless conveyor elements 134 and 136 adapted to support the boxes B. The box feed-in conveyor 10, space permitting, is preferably long enough to accommodate a sufficient number of boxes to insure continuous operation of the system despite a hiatus in the continuity of the supply.

It is contemplated that the several conveyors will be power operated under control of suitably located limit switches (not shown) such that the boxes will be moved through the system in an intermittent succession. A box will be moved to the entrance of the box dumping unit 12 by the box feed-in conveyor 10, while the box dumping unit is going through a dumping cycle. The conveyor in the box dumping unit 12 will be controlled to go through a cradle loading operation, remain at rest during the dumping cycle, and resume operation to discharge the empty box onto the box take-off conveyor 14 after the dumping operation has been completed and the cradle has returned to its normal upright position. The details of the conveyor drive and control circuit are of no particular patentable significance herein, and therefore need not be described.

As further seen in FIG. 1, the box dumping unit 12 is located over the front end of the produce-receiving and conveying unit 16. This unit may be any suitable mechanism for receiving and conveying the produce from the dumping point to a processing station. In its simplest embodiment, an endless conveyor is contemplated for this purpose. In a specific embodiment of the invention, the produce-receiving and conveying unit 16 comprises an elongated tank 138 adapted to hold a circulating body of water by which the produce is conveyed from the input end of the receiving unit to its discharge end. The water within the tank 138 insures the cushioned fall of the produce from the boxes and thereby avoids bruises and other damage that would inevitably result if the produce were discharged onto a firm surface. Furthermore, the rate of water circulation from front to back of the tank can be controlled to regulate the rate at which the produce passes through the tank and thereby avoids surges of produce at the discharge end.

Water circulation within the tank is maintained by a pair of driven impellers 140 and 142 (FIG. 6) which are located, respectively, in conduit legs 144 and 146 of a feeder loop 148. This loop is located externally of the tank proper in order to provide the necessary clearances for a produce elevator. The conduit legs 144 and 146 extend through the respective side walls of the tank about midway of its length and merge in a constricted duct 150 along the bottom of the tank. The duct 150 is preferably flared out to the full width of the tank at its produce-receiving end where it terminates in a liquid return mouth 152 near the top of the forward wall of the tank. The feeder loop 148 communicates with the interior of the tank through a passage 154 formed in the rear wall of the tank.

From the foregoing it can be seen that when the tank is filled with water, the body of water can be maintained in clockwise circulation as viewed in FIG. 5 by driving the impellers 140 and 142. The impellers are preferably driven through variable speed mechanism in order to permit control over the rate of water circulation within the tank.

The produce elevator 156 (FIG. 5) is mounted at an incline in the forward end of the tank such that its rear end extends into proximity with the bottom of the tank and its forward end extends above the tank at the forward wall thereof. The produce elevator 156 is in the form of a foraminous endless belt 158 having attached to a face thereof spaced elevating slats 160, preferably of triangular cross-section. The nature of the belt 158 and the spacing of the slats 160 permits the ready drainage of water from the produce as it is elevated above the surface of the water within the tank. The elevator belt is trained about suitable pulleys 162 and 164, the latter being driven through a variable speed drive 166 (FIG. 1).

The discharge end of the produce elevator 156 is located in proximity to a leaf-and-trash removal assembly 168. This assembly comprises a downwardly inclined runway 170 composed of a plurality of parallel slats which are spaced from each other sufficiently to permit leaves and the like to drop therebetween but avoid passage of the produce. Leaves, water and other matter separated from the produce which pass between the slats of the runway 170 fall into a refuse trough 172 located directly under the runway. The trough 172 extends to one side of the tank and is downwardly inclined such that water, leaves, and the like, may flow to the discharge end of the trough. To assist this flow, the trough 172 may be equipped with a drag conveyor 174. Produce from the runway 170 is discharged into a collecting trough 176 from where it is taken for further processing.

Figure 8:
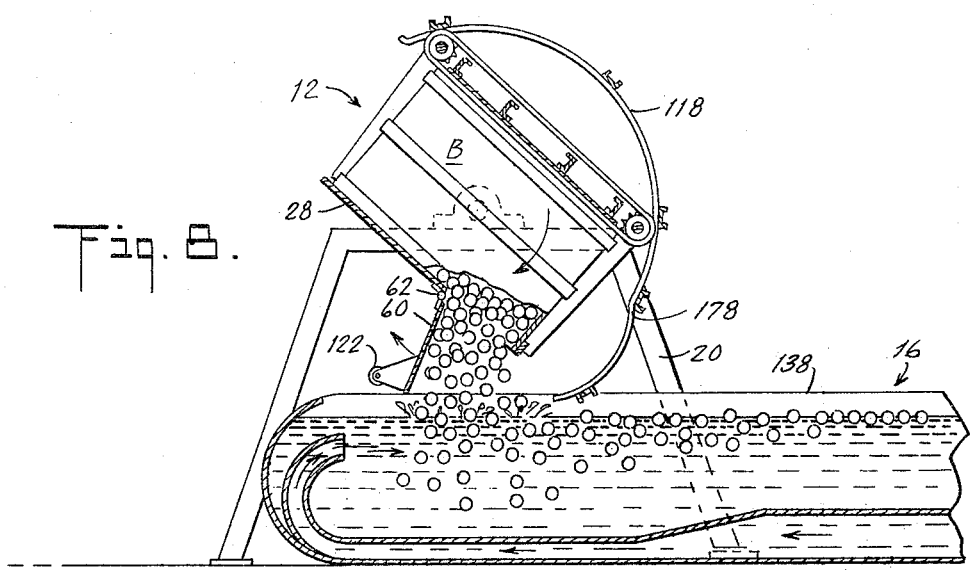
FIG. 8 is a schematic view of the box dumping unit in association with the produce-receiving unit, showing the inversion of a pallet box during the final phase of a produce dumping operation.

To use the system, the fluid pressure devices 40 and 42 are operated to project their respective pistons 36 and 38. This latter action will lift the lid 28 sufficiently to permit a box to be loaded into the dumping unit. The box feed-in conveyor 10 will deliver a box into position at which the conveyors 96 and 98 of the cradle will engage the box and load it into the cradle. When the box is properly loaded, the conveyors 96 and 98 will be disengaged and the fluid pressure devices 40 and 42 will be operated to lower the lid 28 into clamping engagement with the open top of the box. Thereafter, power applied to the drive gear 116 will serve to rotate the cradle on its stub axles 72 and 74. As this rotation is initiated, the cam followers 122 and 124 will come into engagement, respectively, with the cover cams 118 and 120. When this engagement is effected, the cover 60 will be held closed and it will be maintained in its closed position until the cradle has inverted the box as shown in FIG. 7. The cover cams have a constant radius for approximately 170° to a point 178 in FIG. 4 beyond which the cams are formed on a longer radius which permits the cover 60 to swing into a partially open position as shown in FIG. 7. During this phase of the dumping operation, the produce is discharged from the box in a gentle stream. When the cradle rotates to a point wherein the cam followers 122 and 124 are no longer in contact with their respective cams, the cover 60 will be free to swing on its hinge 62 without restriction, such that the dumping operation is completed in the phase of the cycle shown in FIG. 8. The cradle continues to rotate in the clockwise direction, as shown in FIGS. 7 and 8, until it is again in an upright position.

After the cradle has been returned to its upright position, the fluid pressure devices 40 and 42 are again operated to project their respective pistons 36 and 38. This effectively elevates the lid 28 and releases the box for removal from the box dumping unit.

At this time, the conveyors 96 and 98 are set into operation and the box is ejected from the box dumping unit onto the take-off conveyor 14.

In the meanwhile, the impellers 140 and 142 are set into operation at a selected speed thereby drawing water from the tank by way of the water passage 154 and recirculating the same rearwardly through the feeder loop 148 for discharge through the return mouth 152. This will cause the water in the tank to circulate in a clockwise direction, as viewed in FIG. 5, such that the produce is carried forwardly into the influence of the produce elevator 156 which engages the produce, lifts it from the water and deposits it on the runway 170 from which it gravitates into the collecting trough 176.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In container-dumping apparatus, product receiving and conveying unit a dumping cradle adapted to support a container to be dumped, a lid structure associated with said cradle adapted to close the open top of a container within said cradle, lid control means for raising said lid to receive a container into said cradle and for lowering said lid into container-clamping position over the open top of a container within said cradle, means for rotatably supporting said cradle and said associated lid at an elevation over said conveying unit, means for rotating said cradle and said lid as a unit whereby a container within said cradle is inverted therewith into product discharge position, a product discharge aperture in said lid, a cover for said aperture, and cover holding means operatively associated with said cover effective to hold said cover closed until said cradle is rotated into product discharge position, said cover holding means comprising arcuate guide means and a guide follower carried by said cover in contact with said arcuate guide means.

2. The apparatus of claim 1, in which said cover is mounted on said lid by a hinge structure extending transversely of said lid.

3. The apparatus of claim 1, in which said cover holding means comprises laterally spaced arcuate cam tracks, each, respectively, adapted for engagement by one of a pair of spaced cam followers carried by and extending outwardly of said cover.

4. The apparatus of claim 1, in which said lid and said cover are raised and lowered by said control means as a unit in a linear path way away from and toward the open top of a container within said cradle.

5. The apparatus of claim 4, in which said lid control means comprises a pair of reciprocating fluid pressure devices connected between said cradle and said lid at opposite sides of said cradle.

6. The apparatus of claim 1, in which said produce discharge aperture extends substantially across the entire width of said lid.

7. The apparatus of claim 1, in which said cradle is composed of a horizontal container supporting platform and a pair of vertical side walls, in combination comprising an open ended structure adapted to receive a container at one end and discharge the same at the opposite end.

8. The apparatus of claim 1, in which said dumping cradle has container conveyor means comprising a power driven container supporting platform.

9. The apparatus of claim 1, in which said product receiving and conveying unit comprises an elongated tank adapted to contain a body of liquid in combination with means for maintaining a unidirectional flow of liquid within said tank.

10. The apparatus of claim 9, in which a product elevator comprising an inclined endless conveyor is mounted in said tank at the end thereof remote from said dumping cradle.

11. The apparatus of claim 10, in which said endless conveyor comprises a foraminous structure permitting discharge of liquid from the product thereon as the latter is removed from said tank by said conveyor.

References Cited by the Examiner

UNITED STATES PATENTS

| | | | |
|---|---|---|---|
| 597,837 | 1/1898 | Castle | 198—181 |
| 673,595 | 5/1901 | Case | 198—181 |
| 1,186,677 | 6/1916 | Parker | 209—156 |
| 1,209,900 | 12/1916 | Stebler et al. | 209—156 X |
| 1,285,560 | 11/1918 | Chase | 209—156 X |
| 1,744,363 | 1/1930 | Chapman | 214—309 |
| 1,854,130 | 3/1932 | Francis | 214—312 |
| 1,973,767 | 9/1934 | Kimball et al. | 214—307 |
| 2,283,512 | 3/1942 | Sias | 209—173 |
| 2,314,647 | 3/1943 | Logenecker | 214—302 |
| 2,578,603 | 12/1951 | Rothman | 214—311 |
| 2,875,912 | 3/1959 | Thresher et al. | 214—654 |
| 2,894,516 | 7/1959 | Froehlich | 214—311 X |
| 2,936,917 | 5/1960 | Musgrave | 214—311 |
| 2,984,364 | 5/1961 | Lamb. | |
| 3,071,258 | 1/1963 | Seigh et al. | |
| 3,089,598 | 5/1963 | Temple. | |
| 3,136,437 | 6/1964 | Shimmon | 214—307 |

FOREIGN PATENTS 82,300    3/1957    Denmark.

HUGO O. SCHULZ, *Primary Examiner.*

GERALD M. FORLENZA, *Examiner.*

A. GRANT, *Assistant Examiner.*